United States Patent
Mathur et al.

(10) Patent No.: US 9,277,432 B2
(45) Date of Patent: Mar. 1, 2016

(54) SYSTEMS AND METHODS FOR AUTOMATED ON-DEVICE PERFORMANCE TESTING OF MOBILE APPLICATIONS

(71) Applicant: salesforce.com, inc., San Francisco, CA (US)

(72) Inventors: Ashraya Raj Mathur, Fremont, CA (US); Jingshu Xia, Union City, CA (US); Tom Vaughan, San Francisco, CA (US); Venkatesh Katari, San Francisco, CA (US); Prashant Tiwari, San Francisco, CA (US); Sudatta Gautham Sharada Prasad, Sunnyvale, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 14/511,054

(22) Filed: Oct. 9, 2014

(65) Prior Publication Data

US 2015/0099493 A1 Apr. 9, 2015

Related U.S. Application Data

(60) Provisional application No. 61/888,637, filed on Oct. 9, 2013.

(51) Int. Cl.
*H04M 3/42* (2006.01)
*G06F 9/44* (2006.01)
*H04W 24/08* (2009.01)
*G06F 21/62* (2013.01)
*H04W 4/00* (2009.01)

(52) U.S. Cl.
CPC .......... *H04W 24/08* (2013.01); *G06F 21/6227* (2013.01); *H04W 4/003* (2013.01)

(58) Field of Classification Search
CPC ............... G06F 21/10; G06F 11/3409; G06F 2201/865; G06F 11/3452; G06F 11/3466; G06F 11/3688; H04L 63/10; H04L 41/5038; H04W 4/02; H04W 24/08; H04W 4/003
USPC ............................. 455/414.1; 717/124, 127
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |

(Continued)

*Primary Examiner* — Don N Vo
(74) *Attorney, Agent, or Firm* — Ingrassia Fisher & Lorenz, P.C.

(57) ABSTRACT

Methods and systems for measuring the performance of a mobile application and its associated user page flows include a communication link configured to connect a plurality of mobile client devices to an application server running the mobile application. The system includes a first module configured to implement a plurality of mobile network protocols; a second module configured to implement a plurality of mobile carrier protocols; a third module configured to implement a plurality of mobile operating systems; and a processing module configured to download the application and user pages from the application server and measure performance on each of the plurality of mobile client devices using different combinations of the plurality of mobile network protocols, the plurality of mobile carrier protocols, and the plurality of mobile operating systems.

20 Claims, 4 Drawing Sheets

(56) References Cited

U.S. PATENT DOCUMENTS

| | | |
|---|---|---|
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,779,475 B2 | 8/2010 | Jakobson et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2008/0249972 A1 | 10/2008 | Dillon |
| 2009/0063414 A1 | 3/2009 | White et al. |
| 2009/0100342 A1 | 4/2009 | Jakobson |
| 2009/0177744 A1 | 7/2009 | Marlow et al. |
| 2012/0233137 A1 | 9/2012 | Jakobson et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2014/0026123 A1* | 1/2014 | Dhanapal ............ G06F 11/3664 717/124 |
| 2014/0282425 A1* | 9/2014 | Zhao ................... G06F 11/3688 717/127 |
| 2015/0100628 A1* | 4/2015 | LaPine ................ H04M 3/5158 709/203 |
| 2015/0302182 A1* | 10/2015 | Wyatt ....................... G06F 21/10 726/26 |

* cited by examiner

SYSTEMS AND METHODS FOR AUTOMATED ON-DEVICE PERFORMANCE TESTING OF MOBILE APPLICATIONS

CROSS-REFERENCE TO RELATED APPLICATION

This application claims the benefit of U.S. provisional patent application Ser. No. 61/888,637 filed Oct. 9, 2013 the entire contents of which is incorporated herein by this reference.

TECHNICAL FIELD

Embodiments of the subject matter described herein relate generally to measuring the performance of mobile applications on mobile devices, and more particularly to automated testing systems and methods for measuring and recording page flow performance of mobile applications.

BACKGROUND

The unprecedented growth of mobile and social technologies has redefined the way people connect and communicate. On-line social networking sites such as Facebook™, Linkedin™, Pinterest™, Tumblr™, Google+™, Hootsuite™, and Twitter™ have forever changed the way people share information with each other. Smartphones, tablet computers, IPads, and other mobile devices are increasingly used by many consumers as their primary platform for communicating and managing their social, business, financial, and personal affairs. Salesforce1™, available at www.salesforce.com/salesforce1/, is a mobile application providing a sales, service, and marketing platform for facilitating social collaboration with colleagues, partners, products, employees, and customers.

At the same time, software development is evolving away from the client-server model toward network-based processing systems that provide access to data and services via the Internet or other networks. In contrast to traditional systems that host networked applications on dedicated server hardware, a "cloud" computing model allows applications to be provided over the network "as a service" supplied by an infrastructure provider. The infrastructure provider typically abstracts the underlying hardware and other resources used to deliver a customer-developed application so that the customer no longer needs to operate and support dedicated server hardware. The cloud computing model can often provide substantial cost savings to the customer over the life of the application because the customer no longer needs to provide dedicated network infrastructure, electrical and temperature controls, physical security and other logistics in support of dedicated server hardware.

Multi-tenant cloud-based architectures have been developed to improve collaboration, integration, and community-based cooperation between customer tenants without sacrificing data security. Generally speaking, multi-tenancy refers to a system where a single hardware and software platform simultaneously supports multiple user groups (also referred to as "organizations" or "tenants") from a common data storage element (also referred to as a "multi-tenant database"). The multi-tenant design provides a number of advantages over conventional server virtualization systems. First, the multi-tenant platform operator can often make improvements to the platform based upon collective information from the entire tenant community. Additionally, because all users in the multi-tenant environment execute applications within a common processing space, it is relatively easy to grant or deny access to specific sets of data for any user within the multi-tenant platform, thereby improving collaboration and integration between applications and the data managed by the various applications. The multi-tenant architecture therefore allows convenient and cost effective sharing of similar application features between multiple sets of users.

Presently known tools, such as Appurify™, facilitate functional and performance testing of mobile applications and websites. However, in terms of performance, such systems are typically limited to measuring the network latency component, and are not well suited to measure the contributions of client-side performance such as client-side compute and render. In addition, Apple provides iOS-based tools, and Google provides Android-based tools for debugging and measuring performance for mobile applications running on respective simulators/emulators. However, there currently are no tools for testing the end-to-end performance (e.g., measuring server, network and fine grained client-side metrics) or otherwise quantifying the breakdown of entire end-to-end experience associated with using mobile applications on mobile devices.

Systems and methods are thus needed which address these shortcomings.

BRIEF DESCRIPTION OF THE DRAWING FIGURES

A more complete understanding of the subject matter may be derived by referring to the detailed description and claims when considered in conjunction with the following figures, wherein like reference numbers refer to similar elements throughout the figures.

DETAILED DESCRIPTION

Figure 1:
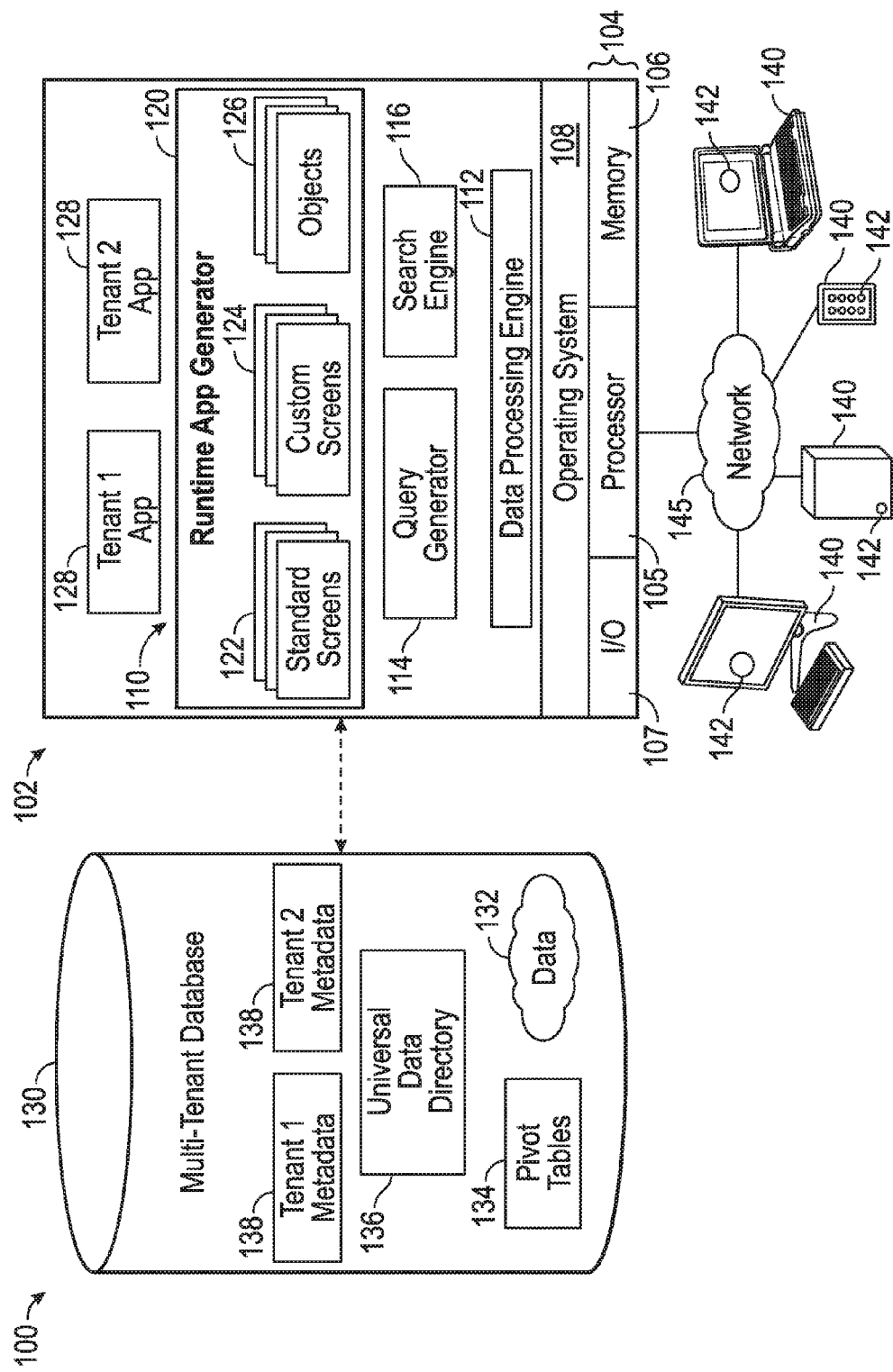
FIG. 1 is a schematic block diagram of a multi-tenant computing environment in accordance with an embodiment.

Embodiments of the subject matter described herein generally relate to systems and methods for measuring the performance of mobile applications on mobile devices.

In an embodiment, for a particular mobile application under inspection, a test platform may be configured to measure performance across a test matrix including i) various mobile operating systems (OS) including: iOS™, Android™, Windows™ and Blackberry™, ii) mobile devices (including various models) from different manufactures including Samsung™, HTC™, Apple™, Huewei™, LG™, Lenovo™; iii) cellular service providers such as Verizon™, Leap Wireless™, Cricket™, Virgin Mobile™, AT&T™, Sprint™, US Cellular™, Net10™, Clearwire™, and T-Mobile™; iii) transmission modes including WiFi, 3G, 4G, LTE, and the like; and iv) mobile browsers including Safari™, Chrome™, Firefox™ and Internet Explorer Mobile™. The automated test platform may be further configured to isolate that portion of the total performance which is attributable to the server, client, and network and also provide fine-grained breakdown for each of the server, client and network components, to thereby facilitate trouble shooting, debugging, and application development.

In this regard, the total time required to load an application and/or subsequent application pages may be sub-divided into three general components: the server, the client device (e.g., mobile phone, tablet), and the network (e.g., AT&T running on 4G). In turn, each of these three components may be further subdivided into subcomponents. For example, the client portion may be divided into parsing, compute, rendering, and so on.

The described subject matter can be implemented in the context of any computer-implemented system, such as a software-based system, a database system, a multi-tenant environment, or the like. Moreover, the described subject matter can be implemented in connection with two or more separate and distinct computer-implemented systems that cooperate and communicate with one another. One or more implementations may be implemented in numerous ways, including as a process, an apparatus, a system, a device, a method, a computer readable medium such as a computer readable storage medium containing computer readable instructions or computer program code, or as a computer program product comprising a computer usable medium having a computer readable program code embodied therein.

Mobile application usage continues to grow exponentially. The present disclosure provides a solution to fully automate mobile performance testing and build a scalable mobile performance lab. That is, the system mimics or simulates the user experience using a laboratory environment. The solution provides a framework for cross-platform and cross-device performance testing which abstracts launching applications, controlling devices, automating page-flows and collecting performance measurements for these page-flows. By integrating performance analysis for mobile applications into the product development lifecycle with an easy to use architecture, product developers are able to analyze performance for development use cases without requiring manual intervention. In an embodiment, the system employs Selenium™-based scripts to drive the user flows.

Testing on mobile platforms is complicated by the myriad of operating system (OS) platforms, primarily iOS and Android. Each of these platforms comes with its own characteristics. There are a lot of design, usability and performance differences for applications across these platforms. The differences are significant for native applications across these platforms. Even for mobile web applications, where mobile browsers often share the same webkit core, the platform specific implementations differ. This includes the graphics stack, network stack, threading, IO, memory management, and the like. For example, in a JavaScript engine, iOS uses Nitro and Chrome uses V8. These inherent differences between platforms and browsers inevitably yield different performance characteristics. Thus, expanding coverages for mobile platform in performance testing is crucial. For efficient testing work, automation and instrumentation for apps across platforms is a most important consideration in the process.

Characteristics also vary across hardware platforms. For example, tablet performance differs from a hand held phone performance due to inherent form factor differences. Within a specific form factor, performance also differs for different devices. For iOS, this is an easier problem to solve and new generation devices are typically faster than the older generation devices. For Android, the market is more fragmented and this lends its own set of problems. Testing on real devices for performance provides accurate real-user experience feedback to the development cycle.

The next challenge is the networks. Mobile devices run on various networks (e.g., Wifi, Edge, 3G, 4G, LTE), and each network has its own characteristics. The impact of bandwidth, latency and packet loss adds another dimension for performance variation for mobile applications. Simulating different network conditions in mobile performance testing is important to understand real user experience.

Further, rapid application development requires quick testing and support across these platforms, devices and networks. Frequent code check-ins often result in performance regressions across one or more of these variables. It is therefore desirable to continuously monitor application performance across this complex matrix and optimize application performance. We have used job schedulers like Jenkins and cron jobs to continuously and automatically run tests on code check-in and based on customized schedules. Results are collected, processed and analyzed automatically based on performance instrumentation and we're able to easily compare results across browsers, devices and operating systems immediately after tests are completed.

Current systems do not provide an adequate solution for mobile performance testing which is cross-platform, device independent, and is scalable. Tools for mobile performance have been lagging their web counterparts and there are no ready tools that can measure performance on mobile devices. In one implementation, the solution described herein bridges this gap and provides a cross-platform and a cross-device framework for scalable and fully automated mobile performance testing.

In one implementation, the framework consists of 2 modules which work together to provide a fully automated mobile performance testing solution. The modules are referred to herein as the Dave module and the Mobitron module.

The Dave module has the following features: i) the ability to write one performance test that can run on a number of platforms and devices [iOS, Android]; ii) based on WebDriver to leverage existing open-source browser and native automation; iii) uses open-source instrumentation frameworks [Boomerang, Jiffy, Kylie] for instrumenting mobile applications; iv) runs on a matrix of platforms, devices and network for performance comparison across the matrix; v) clean architecture for writing performance tests that separates use cases (page-flow scripts) from automation and instrumentation; and vi) scalable, that is, the workload consists of multiple tests (page-flows) and tests can be run on parallel devices using this architecture.

The Mobitron module has the following features: i) works together with Dave to provide device scheduling and management; ii) abstracts launching of mobile applications and controlling the devices in a fully automated way with little or no manual intervention required; iii) simple web interface to setup devices, schedule, monitor and manage devices; iv) based on Web Driver for native, hybrid and browser automation; v) Selenium Web Driver (iOS, Android, Chrome) (See http://docs.seleniumhq.org/projects/webdriver/, http://ios-driver.github.io/ios-driver/, https://code.google.com/p/nativedriver/, and http://selendroid.io/); and vi) based on instrumentation frameworks such as Boomerang, Jiffy and Kylie for web/hybrid performance measurement (See https://github.com/yahoo/boomerang, https://code.google.com/p/jiffy-web/wiki/Jiffy_is, https://github.com/forcedotcom/kylie).

Turning now to FIG. 1, an exemplary cloud based solution may be implemented in the context of a multi-tenant system 100 including a server 102 that supports applications 128 based upon data 132 from a database 130 that may be shared between multiple tenants, organizations, or enterprises, referred to herein as a multi-tenant database. Data and services generated by the various applications 128 are provided via a network 145 to any number of client devices 140, such as desk tops, laptops, tablets, smartphones, Google Glass™, and any other computing device implemented in an automobile, aircraft, television, or other business or consumer electronic device or system, including web clients.

Each application 128 is suitably generated at run-time (or on-demand) using a common application platform 110 that securely provides access to the data 132 in the database 130 for each of the various tenant organizations subscribing to the service cloud 100. In accordance with one non-limiting example, the service cloud 100 is implemented in the form of an on-demand multi-tenant customer relationship management (CRM) system that can support any number of authenticated users for a plurality of tenants.

As used herein, a "tenant" or an "organization" should be understood as referring to a group of one or more users (typically employees) that shares access to common subset of the data within the multi-tenant database 130. In this regard, each tenant includes one or more users and/or groups associated with, authorized by, or otherwise belonging to that respective tenant. Stated another way, each respective user within the multi-tenant system 100 is associated with, assigned to, or otherwise belongs to a particular one of the plurality of enterprises supported by the system 100.

Each enterprise tenant may represent a company, corporate department, business or legal organization, and/or any other entities that maintain data for particular sets of users (such as their respective employees or customers) within the multi-tenant system 100. Although multiple tenants may share access to the server 102 and the database 130, the particular data and services provided from the server 102 to each tenant can be securely isolated from those provided to other tenants. The multi-tenant architecture therefore allows different sets of users to share functionality and hardware resources without necessarily sharing any of the data 132 belonging to or otherwise associated with other organizations.

The multi-tenant database 130 may be a repository or other data storage system capable of storing and managing the data 132 associated with any number of tenant organizations. The database 130 may be implemented using conventional database server hardware. In various embodiments, the database 130 shares processing hardware 104 with the server 102. In other embodiments, the database 130 is implemented using separate physical and/or virtual database server hardware that communicates with the server 102 to perform the various functions described herein.

In an exemplary embodiment, the database 130 includes a database management system or other equivalent software capable of determining an optimal query plan for retrieving and providing a particular subset of the data 132 to an instance of application (or virtual application) 128 in response to a query initiated or otherwise provided by an application 128, as described in greater detail below. The multi-tenant database 130 may alternatively be referred to herein as an on-demand database, in that the database 130 provides (or is available to provide) data at run-time to on-demand virtual applications 128 generated by the application platform 110, as described in greater detail below.

In practice, the data 132 may be organized and formatted in any manner to support the application platform 110. In various embodiments, the data 132 is suitably organized into a relatively small number of large data tables to maintain a semi-amorphous "heap"-type format. The data 132 can then be organized as needed for a particular virtual application 128. In various embodiments, conventional data relationships are established using any number of pivot tables 134 that establish indexing, uniqueness, relationships between entities, and/or other aspects of conventional database organization as desired. Further data manipulation and report formatting is generally performed at run-time using a variety of metadata constructs. Metadata within a universal data directory (UDD) 136, for example, can be used to describe any number of forms, reports, workflows, user access privileges, business logic and other constructs that are common to multiple tenants.

Tenant-specific formatting, functions and other constructs may be maintained as tenant-specific metadata 138 for each tenant, as desired. Rather than forcing the data 132 into an inflexible global structure that is common to all tenants and applications, the database 130 is organized to be relatively amorphous, with the pivot tables 134 and the metadata 138 providing additional structure on an as-needed basis. To that end, the application platform 110 suitably uses the pivot tables 134 and/or the metadata 138 to generate "virtual" components of the virtual applications 128 to logically obtain, process, and present the relatively amorphous data 132 from the database 130.

The server 102 may be implemented using one or more actual and/or virtual computing systems that collectively provide the dynamic application platform 110 for generating the virtual applications 128. For example, the server 102 may be implemented using a cluster of actual and/or virtual servers operating in conjunction with each other, typically in association with conventional network communications, cluster management, load balancing and other features as appropriate. The server 102 operates with any sort of conventional processing hardware 104, such as a processor 105, memory 106, input/output features 107 and the like. The input/output features 107 generally represent the interface(s) to networks (e.g., to the network 145, or any other local area, wide area or other network), mass storage, display devices, data entry devices and/or the like.

The processor 105 may be implemented using any suitable processing system, such as one or more processors, controllers, microprocessors, microcontrollers, processing cores and/or other computing resources spread across any number of distributed or integrated systems, including any number of "cloud-based" or other virtual systems. The memory 106 represents any non-transitory short or long term storage or other computer-readable media capable of storing programming instructions for execution on the processor 105, including any sort of random access memory (RAM), read only memory (ROM), flash memory, magnetic or optical mass storage, and/or the like. The computer-executable programming instructions, when read and executed by the server 102 and/or processor 105, cause the server 102 and/or processor 105 to create, generate, or otherwise facilitate the application platform 110 and/or virtual applications 128 and perform one or more additional tasks, operations, functions, and/or processes described herein. It should be noted that the memory 106 represents one suitable implementation of such computer-readable media, and alternatively or additionally, the server 102 could receive and cooperate with external computer-readable media that is realized as a portable or mobile component or platform, e.g., a portable hard drive, a USB flash drive, an optical disc, or the like.

The application platform 110 is any sort of software application or other data processing engine that generates the virtual applications 128 that provide data and/or services to the client devices 140. In a typical embodiment, the application platform 110 gains access to processing resources, communications interfaces and other features of the processing hardware 104 using any sort of conventional or proprietary operating system 108. The virtual applications 128 are typically generated at run-time in response to input received from the client devices 140. For the illustrated embodiment, the application platform 110 includes a bulk data processing engine 112, a query generator 114, a search engine 116 that provides text indexing and other search functionality, and a runtime application generator 120. Each of these features may be implemented as a separate process or other module, and many equivalent embodiments could include different and/or additional features, components or other modules as desired.

The runtime application generator 120 dynamically builds and executes the virtual applications 128 in response to specific requests received from the client devices 140. The virtual applications 128 are typically constructed in accordance with the tenant-specific metadata 138, which describes the particular tables, reports, interfaces and/or other features of the particular application 128. In various embodiments, each virtual application 128 generates dynamic web content that can be served to a browser or other client program 142 associated with its client device 140, as appropriate.

The runtime application generator 120 suitably interacts with the query generator 114 to efficiently obtain multi-tenant data 132 from the database 130 as needed in response to input queries initiated or otherwise provided by users of the client devices 140. In a typical embodiment, the query generator 114 considers the identity of the user requesting a particular function (along with the user's associated tenant), and then builds and executes queries to the database 130 using system-wide metadata 136, tenant specific metadata 138, pivot tables 134, and/or any other available resources. The query generator 114 in this example therefore maintains security of the common database 130 by ensuring that queries are consistent with access privileges granted to the user and/or tenant that initiated the request.

With continued reference to FIG. 1, the data processing engine 112 performs bulk processing operations on the data 132 such as uploads or downloads, updates, online transaction processing, and/or the like. In many embodiments, less urgent bulk processing of the data 132 can be scheduled to occur as processing resources become available, thereby giving priority to more urgent data processing by the query generator 114, the search engine 116, the virtual applications 128, etc.

In exemplary embodiments, the application platform 110 is utilized to create and/or generate data-driven virtual applications 128 for the tenants that they support. Such virtual applications 128 may make use of interface features such as custom (or tenant-specific) screens 124, standard (or universal) screens 122 or the like. Any number of custom and/or standard objects 126 may also be available for integration into tenant-developed virtual applications 128. As used herein, "custom" should be understood as meaning that a respective object or application is tenant-specific (e.g., only available to users associated with a particular tenant in the multi-tenant system) or user-specific (e.g., only available to a particular subset of users within the multi-tenant system), whereas "standard" or "universal" applications or objects are available across multiple tenants in the multi-tenant system.

The data 132 associated with each virtual application 128 is provided to the database 130, as appropriate, and stored until it is requested or is otherwise needed, along with the metadata 138 that describes the particular features (e.g., reports, tables, functions, objects, fields, formulas, code, etc.) of that particular virtual application 128. For example, a virtual application 128 may include a number of objects 126 accessible to a tenant, wherein for each object 126 accessible to the tenant, information pertaining to its object type along with values for various fields associated with that respective object type are maintained as metadata 138 in the database 130. In this regard, the object type defines the structure (e.g., the formatting, functions and other constructs) of each respective object 126 and the various fields associated therewith.

Still referring to FIG. 1, the data and services provided by the server 102 can be retrieved using any sort of personal computer, mobile telephone, tablet or other network-enabled client device 140 on the network 145. In an exemplary embodiment, the client device 140 includes a display device, such as a monitor, screen, or another conventional electronic display capable of graphically presenting data and/or information retrieved from the multi-tenant database 130, as described in greater detail below.

Typically, the user operates a conventional browser application or other client program 142 executed by the client device 140 to contact the server 102 via the network 145 using a networking protocol, such as the hypertext transport protocol (HTTP) or the like. The user typically authenticates his or her identity to the server 102 to obtain a session identifier ("SessionID") that identifies the user in subsequent communications with the server 102. When the identified user requests access to a virtual application 128, the runtime application generator 120 suitably creates the application at run time based upon the metadata 138, as appropriate. However, if a user chooses to manually upload an updated file (through either the web based user interface or through an API), it will also be shared automatically with all of the users/devices that are designated for sharing.

As noted above, the virtual application 128 may contain Java, ActiveX, or other content that can be presented using conventional client software running on the client device 140; other embodiments may simply provide dynamic web or other content that can be presented and viewed by the user, as desired. As described in greater detail below, the query generator 114 suitably obtains the requested subsets of data 132 from the database 130 as needed to populate the tables, reports or other features of the particular virtual application 128. In various embodiments, application 128 embodies the functionality of a collaboration solution such as the Chatter system, described below.

FIGS. 2-5 describe various embodiments of systems and methods for measuring the performance of mobile applications on mobile devices, and more particularly to automated testing systems for recording page flow performance.

Figures 2, 3:
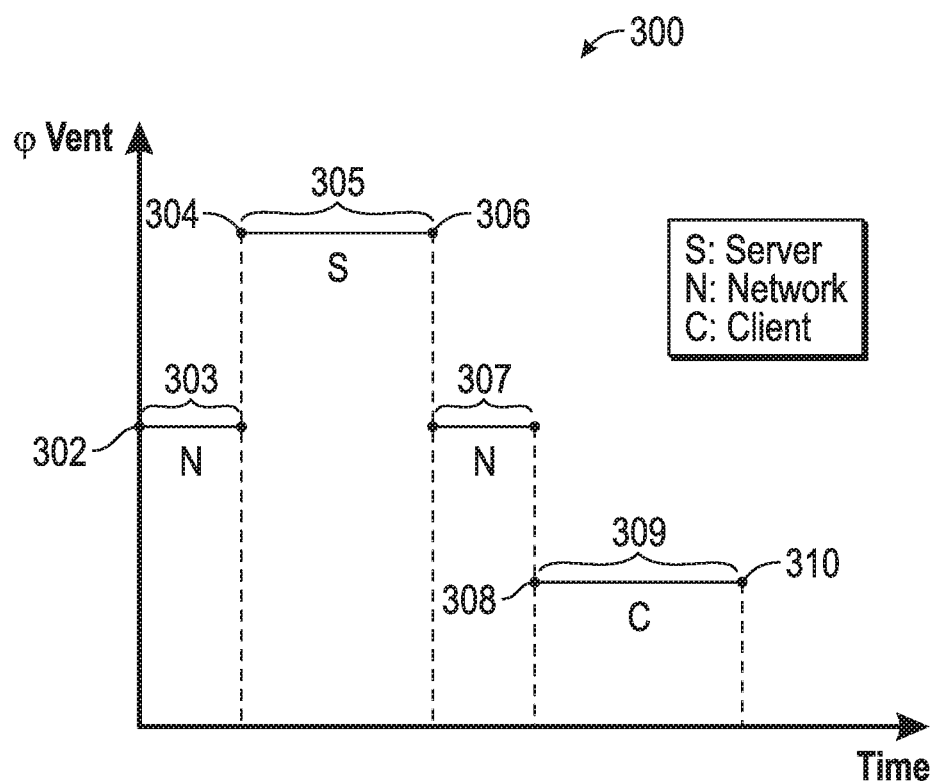
FIG. 2 is a table depicting delay times versus user reaction for a typical page flow on a mobile device in accordance with an embodiment.
FIG. 3 is a graph of discrete events versus time for a typical page flow in accordance with an embodiment.

FIG. 2 is a table 200 depicting exemplary delay times versus user reaction for a typical page flow on a mobile device in accordance with an embodiment. More particularly, the Table 200 indicates that for page flows that take less than approximately one second, the user perceives the event to be essentially instantaneous, corresponding to a highly desirable user experience. For page flows in the range of approximately one to three seconds, the user perceives that the application is functioning normally which corresponds to a neutral user experience. For page loads greater than approximately three seconds, the user may engage in a mental context switch, corresponding to a slightly negative user experience. For page flows in the range of approximately ten seconds or greater, the user perceives that the page flow failed, resulting in a clearly negative user experience.

FIG. 3 is a graph 300 of discrete events versus time for a typical page flow in accordance with an embodiment. In particular, the graph 300 shows a request 302 by a user of a client mobile device (C) for a page load using a mobile application under scrutiny. The time period 303 represents the amount of time it takes for the network (N) to receive, process, and send the page load request to the application server (S). Point 304 represents the time at which the server receives the request, and the time period 305 represents the time it takes for the server to process the request and transmit the page to the network. The point 306 represents the time at which the page is sent to the network. The time period 307 represents the time it takes for the network to transmit the page back to the client device. At point 308, the client device receives the page from the network, and the time period 309 represents the time required for the client device to process and display the page. Finally, at point 310, a fully functional page is displayed to the user on the client device.

Figure 4:
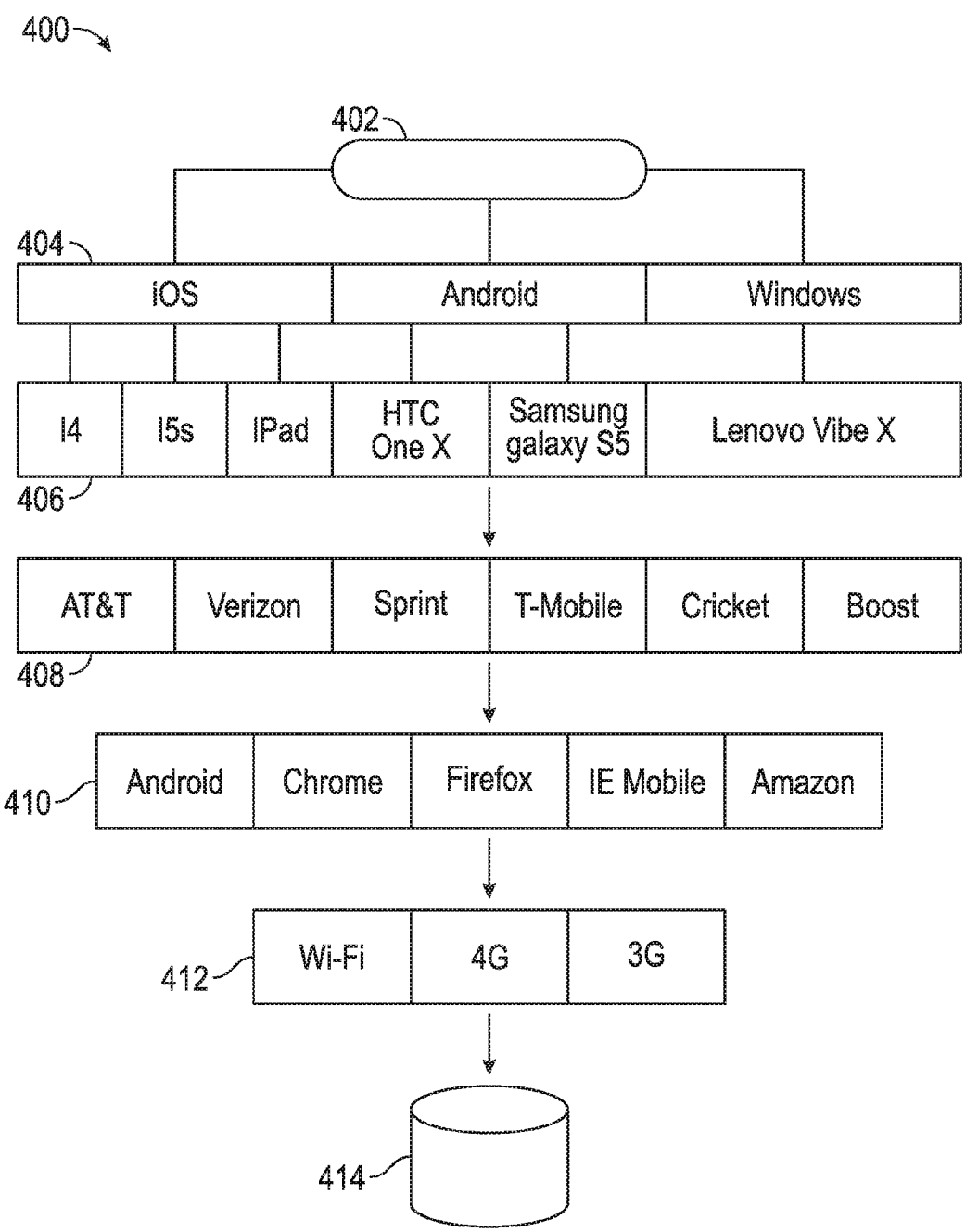
FIG. 4 is schematic diagram illustrating an automated system for measuring performance for multiple browsers, devices, operating systems, and networks in accordance with an embodiment.

FIG. 4 is schematic diagram illustrating an automated system 400 for testing performance for multiple devices, operating systems, networks, and browsers in accordance with an embodiment. More particularly, the system 400 represents a matrix of test variables including an application 402 to be tested, such as a page load sequence in an application such as Facebook. The system 400 further includes an operating system (OS) level which may include any number of mobile operating systems such as, for example, iOS™, Android™, and Windows™ Mobile. The system 400 also includes a device level 406 which may accommodate any number of device models from any number of manufacturers such as, for example, an iPhone™ I4, iPhone I5S, IPad, HTC™ One x, Samsung™ Galaxy S5, Lenovo™ Vibe x, and so on. The system 400 may also contemplate any number of carriers/service provider protocols 408 such as, for example, AT&T™, Verizon™, Sprint™, T-Mobile™, Cricket™, Boost™, and the like. In addition, the matrix implemented by the system 400 may include various browsers 410 such as, for example, Android, Chrome™, Firefox™, Internet Explorer™ Mobile, Amazon™, and the like. The system 400 may also be configured to implement a plurality of network protocols 412 such as, for example, WiFi, 3G, 4G, and the like. Indeed, any other suitable parameter or variable may be included in the matrix implemented by the system 400.m the data collected from the client devices running various combinations of the foregoing parameters may be collected in a database 414 for subsequent processing and display.

With continued reference to FIG. 4 and by non-limiting example, a variety of mobile devices 406 may be connected to a server 402 and a Selenium logger use to record a page flow sequence for various operating systems 404. The page flow sequence may be repeated for a variety of network protocols 412, browsers 410, and carriers 408, and the various metrics recorded in database 414. The application developer may use this data to refine debugging, trouble shooting, and to identify and isolate page flow bottlenecks.

The diagnostic value of this tool may be illustrated using the following example. Suppose a particular model phone from a particular manufacturer running a particular application on a 4G network has a first total latency, and further suppose that the same model phone from the same manufacturer running the same application on a 3G network has a second total latency. The developer knows to focus on latency issues related to a 3G vis-à-vis 4G network when trying to reduce total latency.

Figure 5:
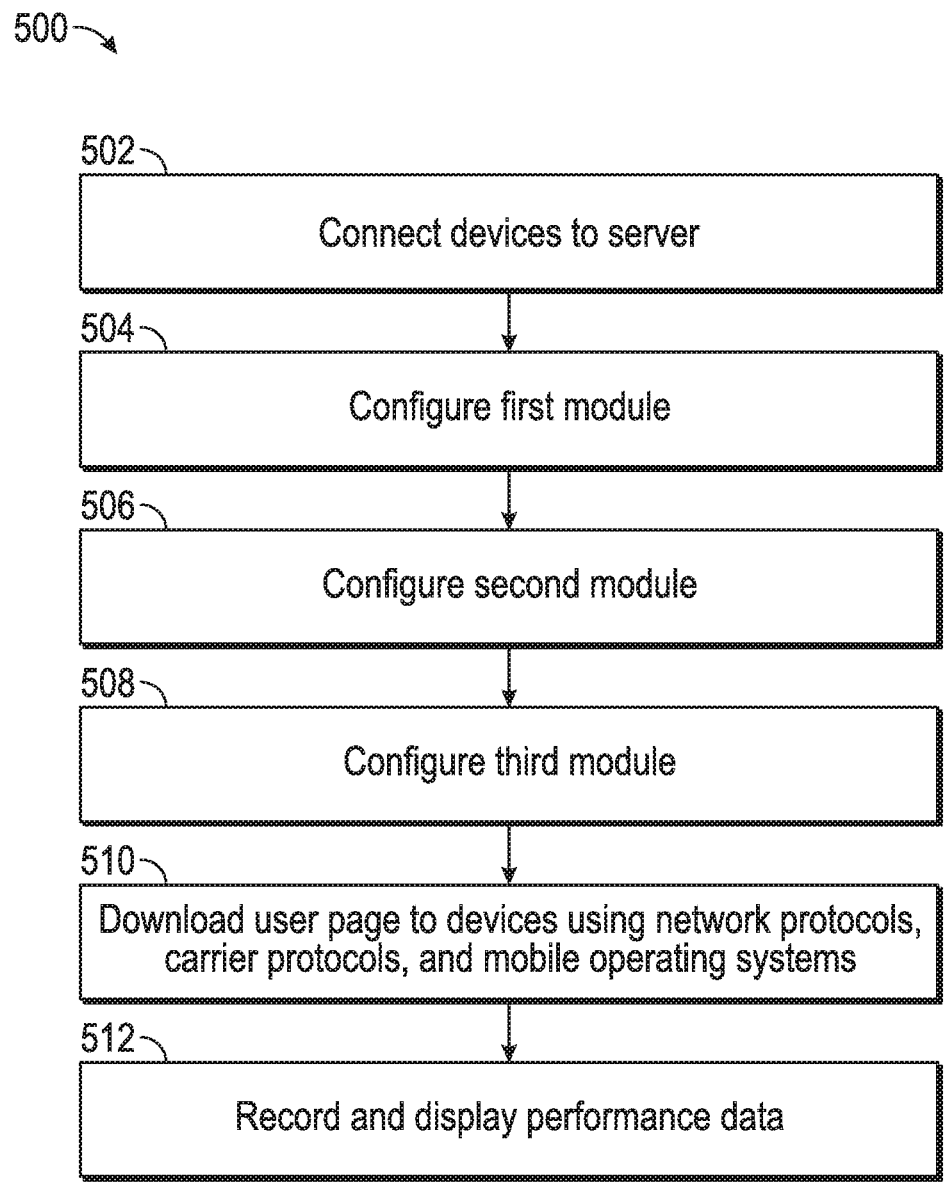
FIG. 5 is a flow chart of an exemplary method for automatically performance testing for multiple browsers, devices, operating systems, and browsers in accordance with an embodiment.

FIG. 5 is a flow chart of an exemplary method 500 for automatically testing performance for multiple browsers, devices, operating systems and networks in accordance with an embodiment. More particularly, the method 500 includes: connecting (Task 502) a plurality of mobile client devices to an application server: configuring (Task 504) a first module to implement a plurality of mobile network protocols; configuring (Task 506) a second module to implement a plurality of mobile carrier protocols; configuring (Task 508) a third module to implement a plurality of mobile operating systems; and downloading (Task 510) the user page from the application server to each of the plurality of mobile client devices using different combinations of the plurality of mobile network protocols, the plurality of mobile carrier protocols, and the plurality of mobile operating systems. The method 500 may also include recording and displaying (Task 512) performance data associated with downloading the user page to the various client devices.

An automated test system is thus provided for measuring the performance of a mobile application including a user page. The system includes: a communication link configured to connect a plurality of mobile client devices to an application server running the mobile application; a first module configured to implement a plurality of mobile network protocols; a second module configured to implement a plurality of mobile carrier protocols; a third module configured to implement a plurality of mobile operating systems; and a processing module configured to download the user page from the application server to each of the plurality of mobile client devices using different combinations of the plurality of mobile network protocols, the plurality of mobile carrier protocols, and the plurality of mobile operating systems.

In an embodiment, the plurality of mobile network protocols comprises at least two of WiFi, LTE, WiMAX, 3G, 4G, Edge, UMTS, EV-DO, iBurst, and HSPA; the plurality of mobile carrier protocols comprises at least two of Verizon™, Leap Wireless™, Cricket™, Virgin Mobile™, AT&T™, Sprint™, US Cellular™, Net10™, Clearwire™, and T-Mobile™; and the plurality of mobile operating systems comprises at least two of iOS™, Android™, Windows™ and Blackberry™.

In an embodiment, the system further comprises a fourth module configured to implement a plurality of mobile browsers, and the processing system is further configured to download the user page from the application server to each of the plurality of mobile client devices using different combinations of the plurality of mobile network protocols, the plurality of mobile carrier protocols, the plurality of mobile operating systems, and the plurality of mobile browsers.

In an embodiment, the plurality of mobile browsers comprises at least two of Android™, Chrome™, Internet Explorer Mobile™, Firefox™, Opera™, Skyfire™, Safari™, Bolt™, Teashark™, Blazer™, Minimo™, Thunderhawk™, and Amazon™.

In an embodiment, the system further comprises a database and a display module, and the processing module is configured to record performance data to the database and display the recorded data on the display module. The performance data may include, for each of the plurality of mobile client devices: a first time period between a download request by the mobile client device and receipt of the request by the application server; a second time period representing processing of the request by the application server; a third time period between transmitting the user page by the application server and receipt of the user page by the mobile client device; and a fourth time period between receipt of the user page by the mobile client device and display of the user page on the mobile client device.

In an embodiment, the processing module is configured to record performance data using a Selenium-based script.

In an embodiment, the processing module comprises: a first processor module configured to correlate the plurality of mobile network protocols, the plurality of mobile carrier protocols, the plurality of mobile operating systems, and the plurality of mobile browsers; and a second processor module configured to schedule the downloading of the user page from the application server to each of the plurality of mobile client devices using the correlated network protocols carrier protocols, mobile operating systems, and mobile browsers.

In an embodiment, the system further comprises a user interface configured to facilitate user interaction with and configuration of the first and second processor modules.

A method is also provided for measuring the performance of a mobile application including a user page. The method includes: connecting a plurality of mobile client devices to an application server running the mobile application; configuring a first module to implement a plurality of mobile network protocols; configuring a second module to implement a plurality of mobile carrier protocols; configuring a third module to implement a plurality of mobile operating systems; and downloading the user page from the application server to each of the plurality of mobile client devices using different combinations of the plurality of mobile network protocols, the plurality of mobile carrier protocols, and the plurality of mobile operating systems.

In an embodiment, the plurality of mobile network protocols comprises at least two of WiFi, LTE, WiMAX, 3G, 4G, Edge, UMTS, EV-DO, iBurst, and HSPA.

In an embodiment, the plurality of mobile network protocols comprises at least two of WiFi, LTE, WiMAX, 3G, 4G, Edge, UMTS, EV-DO, iBurst, and HSPA; the plurality of mobile carrier protocols comprises at least two of Verizon™, Leap Wireless™, Cricket™, Virgin Mobile™, AT&T™, Sprint™, US Cellular™, Net10™, Clearwire™, and T-Mobile™; and the plurality of mobile operating systems comprises at least two of iOS™, Android™, Safari™, Windows™, Blackberry™, Opera™, and Chrome™.

In an embodiment, the method further comprises: configuring a fourth module to implement a plurality of mobile browsers; and downloading the user page from the application server to each of the plurality of mobile client devices using different combinations of the plurality of mobile network protocols, the plurality of mobile carrier protocols, the plurality of mobile operating systems, and the plurality of mobile browsers.

In an embodiment, the method further comprises: recording performance data to a database; and displaying the recorded data on a display module.

In an embodiment, the performance data comprises, for each of the plurality of mobile client devices: a first time period between a download request by the mobile client device and receipt of the request by the application server; a second time period representing processing of the request by the application server; a third time period between transmitting the user page by the application server and receipt of the user page by the mobile client device; and a fourth time period between receipt of the user page by the mobile client device and display of the user page on the mobile client device.

In an embodiment, the method further comprises: correlating the plurality of mobile network protocols, the plurality of mobile carrier protocols, the plurality of mobile operating systems, and the plurality of mobile browsers; and scheduling the downloading of the user page from the application server to each of the plurality of mobile client devices using the correlated network protocols carrier protocols, mobile operating systems, and mobile browsers.

A computer application embodied in a non-transitory medium is also provided for operation by a computer processor associated with an on-demand, multi-tenant computing environment. The application may be configured to implement the steps of: connecting a plurality of mobile client devices to an application server running the mobile application; configuring a first module to implement a plurality of mobile network protocols; configuring a second module to implement a plurality of mobile carrier protocols; configuring a third module to implement a plurality of mobile operating systems; and downloading the user page from the application server to each of the plurality of mobile client devices using different combinations of the plurality of mobile network protocols, the plurality of mobile carrier protocols, and the plurality of mobile operating systems.

In an embodiment, the computer application may be further configured to implement the steps of: configuring a fourth module to implement a plurality of mobile browsers; downloading the user page from the application server to each of the plurality of mobile client devices using different combinations of the plurality of mobile network protocols, the plurality of mobile carrier protocols, the plurality of mobile operating systems, and the plurality of mobile browsers; recording latency data to a database; and displaying the recorded data on a display module.

The foregoing description is merely illustrative in nature and is not intended to limit the embodiments of the subject matter or the application and uses of such embodiments. Furthermore, there is no intention to be bound by any expressed or implied theory presented in the technical field, background, or the detailed description. As used herein, the word "exemplary" means "serving as an example, instance, or illustration." Any implementation described herein as exemplary is not necessarily to be construed as preferred or advantageous over other implementations, and the exemplary embodiments described herein are not intended to limit the scope or applicability of the subject matter in any way.

For the sake of brevity, conventional techniques related to computer programming, computer networking, database querying, database statistics, query plan generation, XML and other functional aspects of the systems (and the individual operating components of the systems) may not be described in detail herein. In addition, those skilled in the art will appreciate that embodiments may be practiced in conjunction with any number of system and/or network architectures, data transmission protocols, and device configurations, and that the system described herein is merely one suitable example. Furthermore, certain terminology may be used herein for the purpose of reference only, and thus is not intended to be limiting. For example, the terms "first", "second" and other such numerical terms do not imply a sequence or order unless clearly indicated by the context.

Embodiments of the subject matter may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In this regard, it should be appreciated that the various block components shown in the figures may be realized by any number of hardware, software, and/or firmware components configured to perform the specified functions.

For example, an embodiment of a system or a component may employ various integrated circuit components, e.g., memory elements, digital signal processing elements, logic elements, look-up tables, or the like, which may carry out a variety of functions under the control of one or more microprocessors or other control devices. In this regard, the subject matter described herein can be implemented in the context of any computer-implemented system and/or in connection with two or more separate and distinct computer-implemented systems that cooperate and communicate with one another. That said, in exemplary embodiments, the subject matter described herein is implemented in conjunction with a virtual customer relationship management (CRM) application in a multi-tenant environment.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application. Accordingly, details of the exemplary embodiments or other limitations described above should not be read into the claims absent a clear intention to the contrary.

What is claimed:

1. An automated test system for measuring the performance of a mobile application including a user page, comprising:
   a communication link configured to connect a plurality of mobile client devices to an application server running the mobile application;
   a first module configured to implement a plurality of mobile network protocols;
   a second module configured to implement a plurality of mobile carrier protocols;
   a third module configured to implement a plurality of mobile operating systems; and
   a processing module configured to download the user page from the application server to each of the plurality of mobile client devices using different combinations of the plurality of mobile network protocols, the plurality of mobile carrier protocols, and the plurality of mobile operating systems.

2. The system of claim 1, wherein the plurality of mobile network protocols comprises at least two of WiFi, LTE, WiMAX, 3G, 4G, Edge, UMTS, EV-DO, iBurst, and HSPA.

3. The system of claim 1, wherein the plurality of mobile carrier protocols comprises at least two of Verizon™, Leap Wireless™, Cricket™, Virgin Mobile™, AT&T™, Sprint™, US Cellular™, Net10™, Clearwire™, and T-Mobile™.

4. The system of claim 1, wherein the plurality of mobile operating systems comprises at least two of iOS™, Android™, Windows™ and Blackberry™.

5. The system of claim 1, further comprising a fourth module configured to implement a plurality of mobile browsers, and wherein the processing system is further configured to download the user page from the application server to each of the plurality of mobile client devices using different combinations of the plurality of mobile network protocols, the plurality of mobile carrier protocols, the plurality of mobile operating systems, and the plurality of mobile browsers.

6. The system of claim 5, wherein the plurality of mobile browsers comprises at least two of Android™, Chrome™, Internet Explorer Mobile™, Firefox™, Opera™, Skyfire™, Safari™, Bolt™, Teashark™, Blazer™, Minimo™, Thunderhawk™, and Amazon™.

7. The system of claim 5, wherein the processing module comprises:
   a first processor module configured to correlate the plurality of mobile network protocols, the plurality of mobile carrier protocols, the plurality of mobile operating systems, and the plurality of mobile browsers; and
   a second processor module configured to schedule the downloading of the user page from the application server to each of the plurality of mobile client devices using the correlated network protocols carrier protocols, mobile operating systems, and mobile browsers.

8. The system of claim 7, further comprising a user interface configured to facilitate user interaction with and configuration of the first and second processor modules.

9. The system of claim 1, further comprising a database and a display module, and wherein the processing module is further configured to record performance data to the database and display the recorded data on the display module.

10. The system of claim 9, wherein the performance data comprises, for each of the plurality of mobile client devices:
    a first time period between a download request by the mobile client device and receipt of the request by the application server;
    a second time period representing processing of the request by the application server;
    a third time period between transmitting the user page by the application server and receipt of the user page by the mobile client device; and
    a fourth time period between receipt of the user page by the mobile client device and display of the user page on the mobile client device.

11. The system of claim 9, wherein the processing module is configured to record performance data using a Selenium-based script.

12. A method of measuring the performance of a mobile application including a user page, the method comprising:
    connecting a plurality of mobile client devices to an application server running the mobile application;
    configuring a first module to implement a plurality of mobile network protocols;
    configuring a second module to implement a plurality of mobile carrier protocols;
    configuring a third module to implement a plurality of mobile operating systems; and
    downloading the user page from the application server to each of the plurality of mobile client devices using different combinations of the plurality of mobile network protocols, the plurality of mobile carrier protocols, and the plurality of mobile operating systems.

13. The method of claim 12, wherein the plurality of mobile network protocols comprises at least two of WiFi, LTE, WiMAX, 3G, 4G, Edge, UMTS, EV-DO, iBurst, and HSPA.

14. The method of claim 12, wherein:
    the plurality of mobile network protocols comprises at least two of WiFi, LTE, WiMAX, 3G, 4G, Edge, UMTS, EV-DO, iBurst, and HSPA;

the plurality of mobile carrier protocols comprises at least two of Verizon™, Leap Wireless™, Cricket™, Virgin Mobile™, AT&T™, Sprint™, US Cellular™, Net10™, Clearwire™, and T-Mobile™; and the plurality of mobile operating systems comprises at least two of iOS™, Android™, Safari™, Windows™, Blackberry™, Opera™, and Chrome™.

15. The method of claim 12, further comprising:

configuring a fourth module to implement a plurality of mobile browsers; and downloading the user page from the application server to each of the plurality of mobile client devices using different combinations of the plurality of mobile network protocols, the plurality of mobile carrier protocols, the plurality of mobile operating systems, and the plurality of mobile browsers.

16. The method of claim 12, further comprising:

recording performance data to a database; and displaying the recorded data on a display module.

17. The method of claim 16, wherein the performance data comprises, for each of the plurality of mobile client devices:

a first time period between a download request by the mobile client device and receipt of the request by the application server;

a second time period representing processing of the request by the application server;

a third time period between transmitting the user page by the application server and receipt of the user page by the mobile client device; and a fourth time period and fine-grained breakdown of client-side performance between receipt of the user page by the mobile client device and display of the user page on the mobile client device.

18. The method of claim 12, further comprising:

correlating the plurality of mobile network protocols, the plurality of mobile carrier protocols, the plurality of mobile operating systems, and the plurality of mobile browsers; and scheduling the downloading of the user page from the application server to each of the plurality of mobile client devices using the correlated network protocols carrier protocols, mobile operating systems, and mobile browsers.

19. A computer application embodied in a non-transitory medium for operation by a computer processor associated with an on-demand, multi-tenant computing environment, the application configured to implement the steps of:

connecting a plurality of mobile client devices to an application server running the mobile application;

configuring a first module to implement a plurality of mobile network protocols;

configuring a second module to implement a plurality of mobile carrier protocols;

configuring a third module to implement a plurality of mobile operating systems; and downloading the user page from the application server to each of the plurality of mobile client devices using different combinations of the plurality of mobile network protocols, the plurality of mobile carrier protocols, and the plurality of mobile operating systems.

20. The computer application of claim 19 further configured to implement the steps of:

configuring a fourth module to implement a plurality of mobile browsers;

downloading the user page from the application server to each of the plurality of mobile client devices using different combinations of the plurality of mobile network protocols, the plurality of mobile carrier protocols, the plurality of mobile operating systems, and the plurality of mobile browsers; recording latency data to a database; and displaying the recorded data on a display module.

* * * * *